(12) United States Patent
Hidewasa

(10) Patent No.: US 6,762,935 B2
(45) Date of Patent: Jul. 13, 2004

(54) ELECTRONIC APPARATUS AND ELECTRIC PART

(75) Inventor: Shigeru Hidewasa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/917,761

(22) Filed: Jul. 31, 2001

(65) Prior Publication Data

US 2001/0053064 A1 Dec. 20, 2001

Related U.S. Application Data

(63) Continuation of application No. PCT/JP99/01195, filed on Mar. 11, 1999.

(51) Int. Cl.$^7$ ................................................ G06F 1/20
(52) U.S. Cl. ........................ 361/687; 257/708; 62/259.2
(58) Field of Search ................................. 361/687, 704, 361/683–686, 717–722; 165/104.33, 86, 185, 80.2–80.4, 104.26, 104.29; 174/15.2, 16.3; 62/259.2; 257/706, 727

(56) References Cited

U.S. PATENT DOCUMENTS

| | | | |
|---|---|---|---|
| 5,138,523 A | | 8/1992 | Benck et al. ................ 361/386 |
| 5,898,569 A | * | 4/1999 | Bhatia ......................... 361/700 |
| 5,974,556 A | * | 10/1999 | Jackson et al. ............. 713/322 |
| 6,084,769 A | * | 7/2000 | Moore et al. ................ 361/687 |
| 6,111,748 A | * | 8/2000 | Bhatia ......................... 361/695 |
| 6,181,553 B1 | * | 1/2001 | Cipolla et al. .............. 361/687 |
| 6,359,780 B1 | * | 3/2002 | McMahan et al. .......... 361/687 |

FOREIGN PATENT DOCUMENTS

| | | |
|---|---|---|
| JP | 5-210449 | 8/1993 |
| JP | 7-245849 | 9/1995 |
| JP | 8-76892 | 3/1996 |
| JP | 9-204250 | 8/1997 |
| JP | 10-116133 | 5/1998 |
| JP | 3057021 | 12/1998 |

OTHER PUBLICATIONS

Copy of PCT International Preliminary Examination Report with International Search Report for corresponding PCT/JP99/01195 dated Sep. 27, 2000.
Copy of U.S. patent application No. 08/885,857.

* cited by examiner

Primary Examiner—Darren Schuberg
Assistant Examiner—Hung Van Duong
(74) Attorney, Agent, or Firm—Armstrong, Kratz, Quintos, Hanson & Brooks, LLP

(57) ABSTRACT

An electronic apparatus is provided with an electric part which can be attached to an outer wall of the apparatus body. The electric part has terminals for accomplishing electric connection of the electric part with the apparatus body, and a heat radiating structure for radiating heat generated in the apparatus body. The heat radiating structure is formed by an uneven wall structure, a heat radiating member, a fan and so forth. Accordingly, the electric part can be attached to the electronic apparatus from the outside thereof, and heat generated in the apparatus body of the electronic apparatus can be radiated by the heat radiating structure arranged in the electric parts, so that an electronic part arranged in the electronic apparatus can operate normally without being excessively heated.

10 Claims, 5 Drawing Sheets

ELECTRONIC APPARATUS AND ELECTRIC PART

CROSS-REFERENCE TO RELATED APPLICATIONS

This application is a continuation of PCT/JP99/01195 filed Mar. 11, 1999.

TECHNICAL FIELD OF THE INVENTION

The present invention relates to an electronic apparatus and an electric part attached to the electronic apparatus.

BACKGROUND OF THE INVENTION

Recently, an electronic information processing apparatus such as a note type personal computer has been reduced in size and weight so that it can be used as a portable-type electronic apparatus. The portable type electronic apparatus includes a battery, the capacity of which is relatively large, so that the replacement of the battery is usually unnecessary and accordingly, the battery is accommodated in the apparatus body. However, it is required to reduce the size of the battery itself, and in some cases, it becomes necessary to replace the battery in view of the relationship between the size, weight and volume of the battery.

In the case where the battery is accommodated in the electronic apparatus body, it is not easy to replace the battery. In order to easily replace the battery, it is preferable that the battery is detachably attached to the electronic apparatus body on the outside of the latter.

Japanese Unexamined Patent Publication No. 3-27596 discloses a small electronic apparatus in which the battery is arranged in a recess formed in the apparatus body and a surface of the battery is exposed outside so that the surface of the battery constitutes a portion of the surface of the apparatus body.

Japanese Unexamined Patent Publication No. 6-163015 discloses an accommodation structure of a battery pack in which a recess is provided on the side of the apparatus body and the battery can be attached to the apparatus body by inserting the battery into this recess.

Japanese Unexamined Patent Publication No. 8-76887 discloses a thin structure in an information apparatus in which the battery can be attached to the rear of the apparatus body.

Japanese Unexamined Patent Publication No. 8-55617 discloses a battery pack and its connection structure in which the battery can be connected to a connector arranged in the apparatus body from above, below or the side when the battery is attached to the apparatus body.

Japanese Unexamined Patent Publication No. 10-116133 discloses a portable type information apparatus in which a connector is provided in the apparatus body and a connector box for extension can be connected to this connector. The connector box for extension includes a connector capable of being connected to the connector of the apparatus body and a plurality of connectors capable of being connected to other parts.

In the above patent publication, the connector box for extension may include a battery for extension (an external battery) with respect to a battery arranged in the apparatus body (a built-in battery). In the case of an information processing apparatus including the built-in battery and the external battery, even when the built-in battery has served its life, it is possible to operate the information processing apparatus by the external battery. Further, the usable condition of the information processing apparatus can be more extended, by increasing the capacity of the external battery.

In the case of an information processing apparatus having no external battery, heat generated in the information processing apparatus can be radiated outside from the outer wall of the information processing apparatus. However, in the case where the external battery is attached to the information processing apparatus, the external battery is arranged to closely contact the outer wall of the information processing apparatus, and at the joining region between the external battery and the information processing apparatus, heat generated in the information processing apparatus is prevented from radiating outside from the outer wall of the information apparatus. For the above reasons, there is a possibility that temperature of the electronic parts (especially, temperature of a CPU) arranged in the information processor is raised.

SUMMARY OF THE INVENTION

It is an object of the present invention to provide an electronic apparatus and an electric part, in which the temperature of an electronic part in the electronic apparatus is not excessively raised even if the external electric part is attached to the electronic apparatus.

In order to accomplish the above object, the present invention provides an electronic apparatus comprising an apparatus body, and an electric part detachably attached to the apparatus body, wherein the electric part is attached to an outer wall of the apparatus body, and the electric part is provided with terminals for accomplishing electric connection of the electric part with the apparatus body and a heat radiating structure for radiating heat generated in the apparatus body.

With this structure, heat generated in the electronic apparatus is radiated through the heat radiating structure provided in the electric part. Consequently, the temperature of the electronic part arranged in the electronic apparatus is not excessively raised, Preferably, the heat radiating structure comprises an uneven wall structure allowing passage of air between an outer surface of the electric part and an outer surface of the apparatus body. The heat radiating structure may comprise a heat radiating member for radiating heat generated in the apparatus body via the electric part. The heat radiating structure may include a fan for radiating heat generated in the apparatus body via the electric part. The heat radiating structure may comprise a structure in which two or three of the above means are combined with each other.

Preferably, the apparatus body and the electric part include mechanical connection means for mechanically connecting the electric part to the apparatus body. Preferably, the electric part is a battery pack, or a connector box to which another part can be further attached.

Preferably, the electric part extends long along a rear portion of the apparatus body. In this case, the length of the electric part is not less than half of the length of the rear portion of the apparatus body, and preferably, the length of the electric part is substantially the same as that of the rear portion of the apparatus body.

Preferably, the electronic apparatus is a notebook type information processing apparatus having a portion including a keyboard and a portion, attached to the portion including the keyboard, including a display.

In addition, an electric part according to the present invention comprises terminals for accomplishing an electric connection and a heat radiating structure for radiating heat generated in the apparatus body.

In this case too, the heat radiating structure comprises an uneven wall structure allowing a passage of air between an outer surface of the electric part and an outer surface of the apparatus body. The heat radiating structure may comprise a heat radiating member for radiating heat generated in the apparatus body via the electric part. The heat radiating structure may include a fan for radiating heat generated in the apparatus body via the electric part. The heat radiating structure may comprise a structure in which two or three of the above means are combined with each other. The electric part includes a mechanical connection means for mechanically connecting the electric part to the apparatus body. The electric part is a battery pack, or a connector box to which another part can be further attached.

BRIEF DESCRIPTION OF THE DRAWINGS

The present invention will be now explained with reference to preferred embodiments shown in the appended drawings, in which.

BEST MODE FOR CARRYING OUT THE INVENTION

Figure 1:
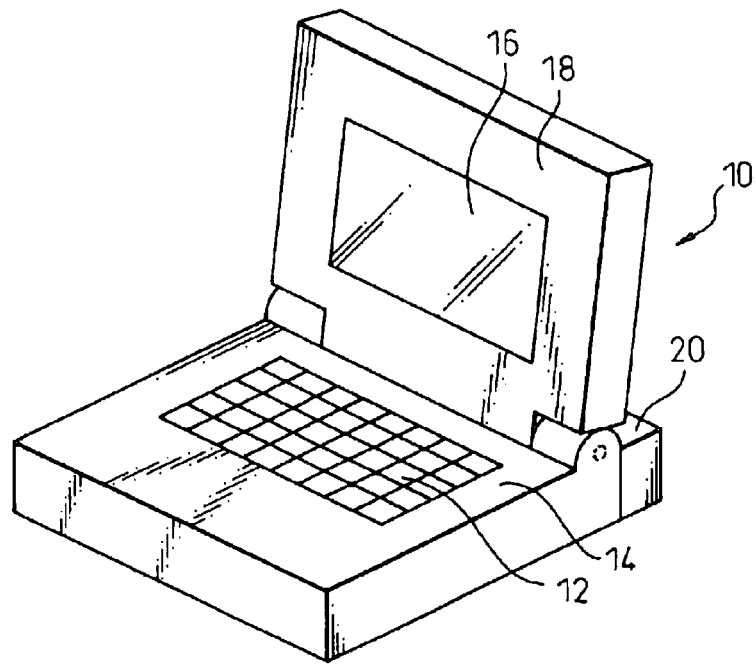
FIG. 1 is a perspective view showing an electronic apparatus of an embodiment of the present invention.
Figure 2:
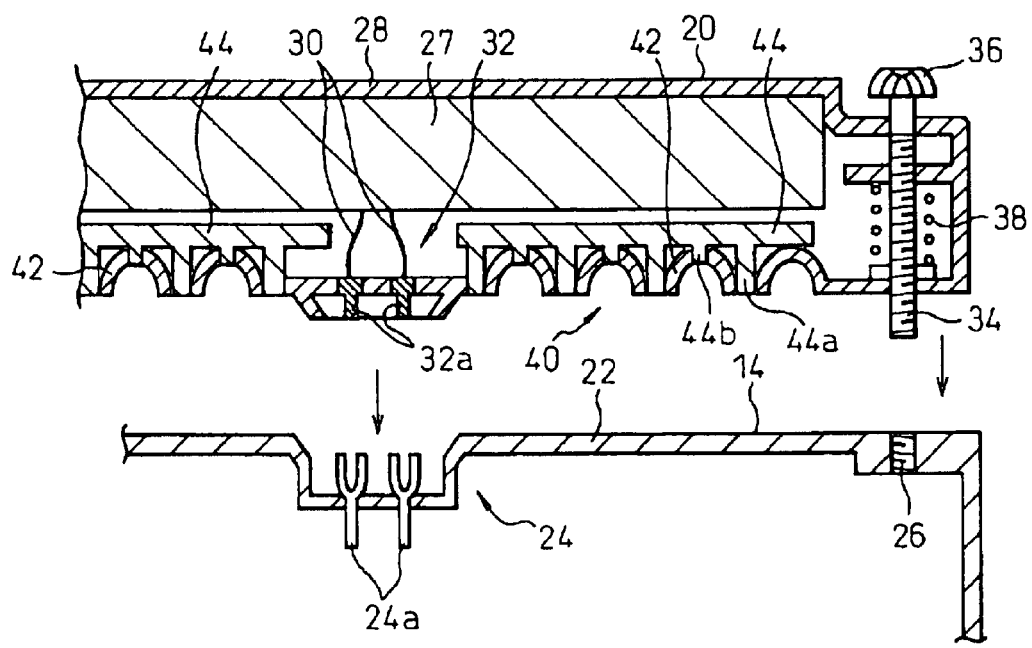
FIG. 2 is a partially enlarged cross-sectional view of the electronic apparatus of FIG. 1.

FIGS. 1 and 2 show an electronic apparatus of an embodiment of the present invention. The portable type electronic apparatus (information processing apparatus) 10, which is constructed as a notebook type personal computer, has a portion 14 including a keyboard 12, and a portion 18, pivotally attached to the portion 14 including the keyboard 12, and including a display 16. The portion 14 including the keyboard 12 is called an apparatus body and includes a printed circuit board and electronic parts below the keyboard 12.

The portion 14 including the keyboard 12 is formed in a substantially rectangular surface profile. The portion 14 is arranged such that a battery pack 20 can be attached to the rear of the portion 14 including the keyboard 12. The battery pack 20 extends long along the rear of the portion 14 (apparatus body) including the keyboard 12. Preferably, the length of the battery pack 20 is not less than half of the length of the rear of the apparatus body. In the preferred embodiment, the length of the battery pack 20 is substantially the same as the length of the rear of the apparatus body.

FIG. 2 shows an attaching structure by which the battery pack 20 is attached to the portion 14 including the keyboard 12. An outer wall 22 of the rear of the portion 14 including the keyboard 12 is substantially flat, and the battery pack 20 is attached to this outer wall 22. The outer wall 22 includes a connector 24 for electrically connecting the battery pack 20 to the apparatus body, and screw holes 26 for mechanically connecting the battery pack 20 to the apparatus body. The connector 24 includes a plurality of terminals 24a, which are connected to the printed circuit board (not shown) arranged in the portion 14 including the keyboard 12.

The battery pack 20 is composed in such a manner that a lithium battery 27 is molded with and covered by a resin outer wall 28. The battery pack 20 includes a connector 32 connected to the lithium battery 27 by leads 30, and screws 34 for mechanically connecting the battery pack 20 to the apparatus body. The connector 32 includes a plurality of terminals 32a.

When the battery pack 20 is pressed against the outer wall 22 of the rear of the portion 14 including the keyboard 12, the connector 32 is fitted in the connector 24, so that the battery pack 20 is electrically connected to the portion 14 including the keyboard 12. When the screw 34 is turned, the screw 34 is threaded in the screw hole 26, and the battery pack 20 is mechanically connected to the portion 14 including the keyboard 12.

The head 36 of the screw 34 is located outside the battery pack 20. The screw 34 is urged by a spring 38, so that the threaded section at the forward end thereof is normally located outside the battery pack 20. Accordingly, when the head 36 of the screw 34 is turned by hand, the screw 34 is threaded in the screw hole 26. In this way, the battery pack 20 can be attached to the information processing apparatus 10 from the outside.

Further, the battery pack 20 has a heat radiating structure 40 for radiating heat generated in the apparatus body of the electronic apparatus 10. In FIG. 2, the heat radiating structure 40 includes a fin-shaped uneven wall structure 42 which is formed on the outer wall 28 of the battery pack 20 as projections and depressions. In the arrangement in which the battery pack 20 is attached to the outer wall 22 of the electronic apparatus 10 in a substantially close contact therewith, the uneven wall structure 42 forms gaps between the outer surface of the battery pack 20 and the outer surface of the apparatus body of the electronic apparatus 10, allowing air to pass therethrough.

Therefore, heat generated by the CPU and other components in the apparatus body of the electronic apparatus 10 can pass through the passage for air formed by the uneven wall structure 42 and escape to the outside of the apparatus body of the electronic apparatus 10. Accordingly, an electronic part such as the CPU provided in the apparatus body of the electronic apparatus 10 is not excessively heated, and an electronic part such as the CPU can continue to operate normally.

Further, the heat radiating structure 40 includes a heat radiating member (heat sink) 44 for radiating heat generated in the apparatus body of the electronic apparatus 10 via the battery pack 20. The heat radiating member 44 is arranged in the outer wall 28 of the battery pack 20, but portions 44a of the heat radiating member 44 are exposed at the projections of the uneven wall structure 40, so that the portions 44a of the heat radiating member 44 come into contact with the outer surface of the apparatus body of the electronic apparatus 10, when the battery pack 20 is attached to the apparatus body of the electronic apparatus 10. Therefore, heat generated in the apparatus body of the electronic apparatus 10 flows through the heat radiating member 44.

Also, portions 44b of the heat radiating member 44 are exposed at the depressions of the uneven wall structure 42, so that heat flowing through the heat radiating member 44 flows into the air passage in the uneven wall structure 42. Further, heat flowing through the heat radiating member 44 flows to the outside of the battery pack 20 via other portions of the battery pack 20.

As described above, even when the battery pack 20 is attached to the apparatus body of the electronic apparatus 10, heat generated in the apparatus body of the electronic apparatus 10 can be radiated to the outside of the apparatus body of the electronic apparatus 10 by the heat radiating structure 40 provided in the battery pack 20. Accordingly, an electronic part such as the CPU provided in the apparatus body of the electronic apparatus 10 is not excessively heated, and an electronic part such as the CPU can continue to operate normally.

In the above example, the heat radiating structure 40 is composed by the combination of the uneven wall structure 42 and the heat radiating member 44. However, it is also possible to compose the heat radiating structure 40 by any one of the uneven wall structure 42 and the heat radiating member 44.

Figure 3:
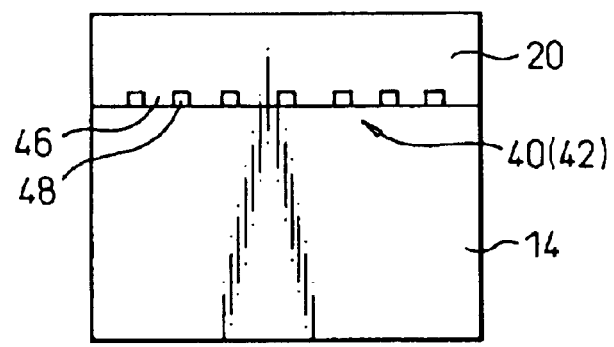
FIG. 3 is a plan view of the electronic apparatus including a heat radiating structure.
Figure 4:
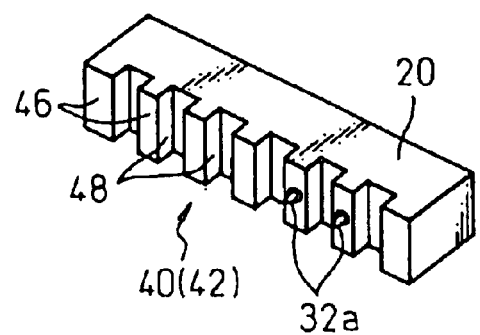
FIG. 4 is a perspective view of the battery pack of FIG. 3.

FIGS. 3 and 4 show an example in which the heat radiating structure 40 is composed of the uneven wall structure 42. The uneven wall structure 42 is composed in such a manner that the projections 46 are formed at longer intervals and the depressions 48 are formed between the projections 46. Air can pass through the depressions 48.

In this connection, the uneven wall structure 42 of this example is formed by the projections 46 and the depressions 48 formed at a plurality of positions, but it is possible to arrange the uneven wall structure in such a manner that only portions which must be contacted with the apparatus body (screwing portions and connector portions) may be formed as the projections 46 and other portions may be formed as the depression 48. However, the uneven wall structure 42 shown in this example is more advantageous because the area at which it contacts the apparatus body is larger so that the attaching strength is higher.

Figure 5:
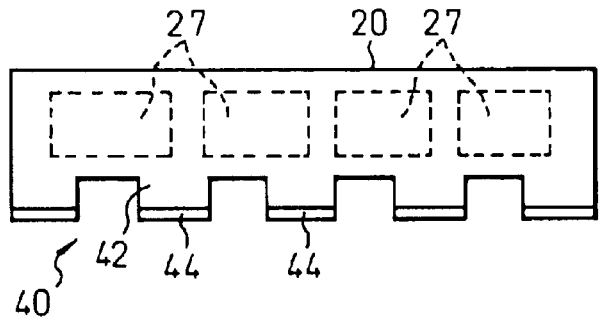
FIG. 5 is a plan view of a battery pack including a heat radiating structure.

FIG. 5 shows an example in which the heat radiating structure 40 is composed of the combination of the uneven wall structure 42 and the heat radiating member 44. The heat radiating member 44 is attached to the surface of the projection 46 of the uneven wall structure 42, so that the heat radiating member 44 can be directly contacted with the outer wall of the apparatus body of the information processor 10.

Figure 6:
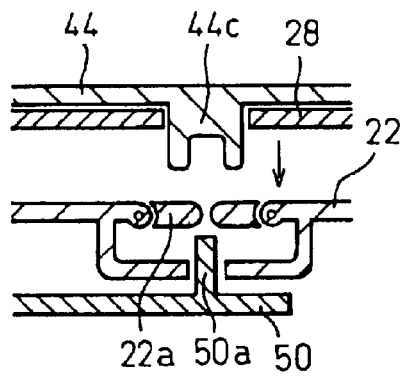
FIG. 6 is a cross-sectional view showing an example of a heat radiating member.
Figure 7:
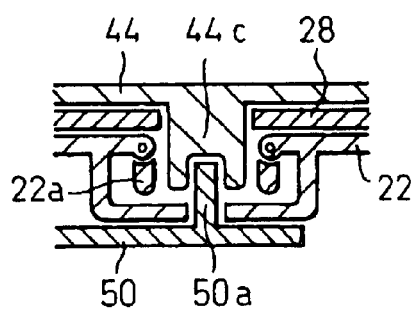
FIG. 7 is a cross-sectional view explaining the operation of the heat radiating plate member of FIG. 6.

FIGS. 6 and 7 show a variation of the heat radiating member 44. A portion 44c of the heat radiating member 44 is formed so as to protrude from the outer wall 28 of the battery pack 20. On the other hand, a heat radiating member 50 is arranged inside the outer wall 22 of the apparatus body of the electronic apparatus 10. This heat radiating member 50 is arranged to contact the electronic part in the electronic apparatus 10, as is well known. A portion 22a of the outer wall 22 of the apparatus body of the electronic apparatus 10 is arranged such that it can be opened and closed and urged by a spring in the closing direction. When the battery pack 20 is attached to the electronic apparatus 10, the portion 44c of the heat radiating member 44 pushes and opens the portion 22a of the outer wall 22 of the apparatus body of the electronic apparatus 10, and contacts the portion 50a of the heat radiating member 50. In this case, heat generated by the electronic part in the electronic apparatus 10 is directly radiated to the heat radiating member 44.

Figure 8:
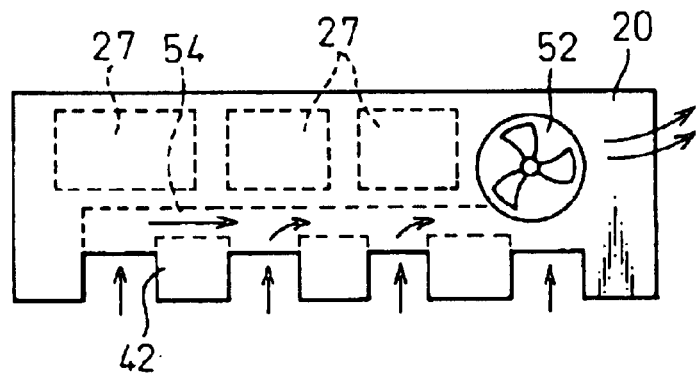
FIG. 8 is a plan view of a battery pack including a heat radiating structure.

FIG. 8 shows an example in which the heat radiating structure 40 includes the uneven wall structure 42 and a fan 52. The fan 52 is arranged in the battery pack 20, and an air passage 54 is formed in the battery pack 20. Therefore, when the fan 52 is rotated, heat generated in the electronic apparatus 10 flows in the battery pack 20 together with air flowing through the air passage 54 and is radiated to the outside of the battery pack 20.

Figure 9:
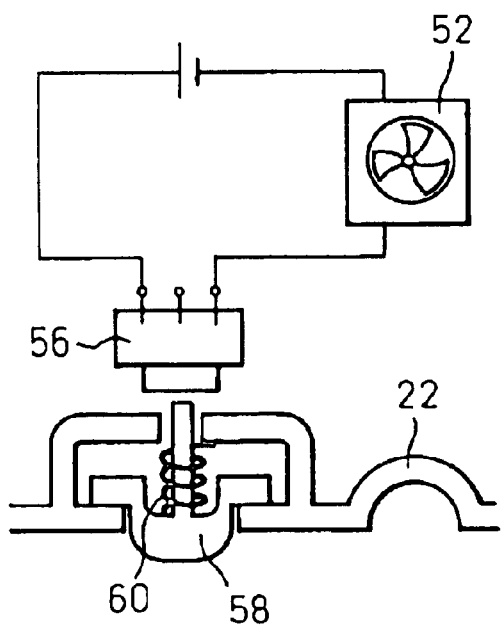
FIG. 9 is a schematic view showing a drive circuit for the fan illustrated in FIG. 8.

FIG. 9 shows a drive circuit of the fan 52. A push switch 56 is inserted in the drive circuit of the fan 52. The push switch 56 is operated by an actuator 58 arranged on the outer wall 22 of the apparatus body of the electronic apparatus 10. The actuator 58 is driven by a signal not shown in the drawing and returned by a spring 60. When the actuator 58 is driven while the battery pack 20 is attached to the electronic apparatus 10, the push switch 56 is turned on, so that the fan 52 can be driven.

Figure 10:
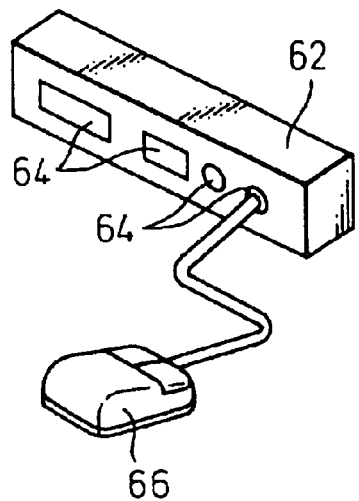
FIG. 10 is a perspective view showing an example of a connector box.

FIG. 10 shows a connector box 62. The connector box 62 can be attached to the apparatus body of the electronic apparatus 10, instead of the battery pack 20 shown in FIGS. 1 to 9. Accordingly, the connector box 62 has a connector and screws (not shown) identical to the connector 32 and screws 34 of the battery pack 20. The connector box 62 further has a plurality of connectors 64. Other electronic parts (so-called peripheral device) can be attached to the connectors 64, for extending the function of the information processing apparatus 10. In FIG. 10, a mouse 66 is attached to one of the connectors 64.

Figure 11:
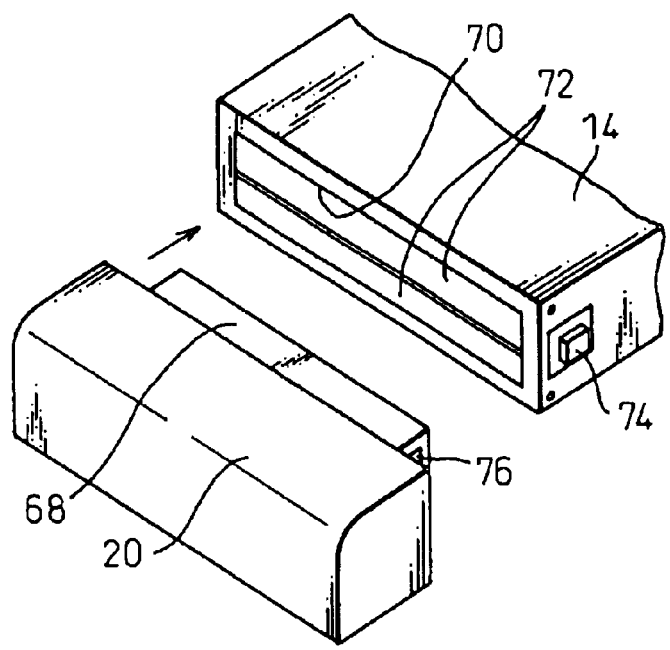
FIG. 11 is a perspective view showing another example of the electronic apparatus.

FIG. 11 shows another example of the electronic apparatus. In this example, the battery pack 20 has a protruding portion 68. The protruding portion 68 can be inserted into an inner space 70 formed in the rear end surface of the portion 14 including the keyboard 12. The inner space 70 is provided with a door 72. A connector (for example, the connector 32 of FIG. 2) provided in the protruding portion 68 is fitted in a connector (for example, the connector 24 of FIG. 2) provided in the inner space 70. Also, an elastically deformable pawl 74 arranged on the side of the portion 14 including the keyboard 12 is engaged with an engaging hole 76 formed on the side of the protruding portion 68 to accomplish mechanical connection.

Concerning the wiring arranged in the battery box 20 and the connector box 62, a structure same as that disclosed in Japanese Unexamined Patent Publication 10-116133 may be adopted.

In the above example, examples in which the battery pack 20 and the connector box 62 are attached to the electronic apparatus from the outside thereof are explained, but the electric parts attached to the electronic apparatus from the outside thereof are not limited to the battery pack 20 and the connector box 62.

INDUSTRIAL APPLICABILITY

As explained above, the electric part is attached to the electronic apparatus from the outside thereof, and heat generated in the apparatus body of the electronic apparatus is radiated by the heat radiating structure provided in the electric part, so that the electronic part provided in the electronic apparatus can operate normally without being excessively heated.

LIST OF REFERENCE NUMERALS

10 . . . Electronic apparatus
12 . . . Keyboard

14 . . . Portion including keyboard
14E . . . Extended end portion
16 . . . Display
18 . . . Portion including display
20 . . . Battery pack
22 . . . Outer wall
22a . . . Portion of outer wall
24 . . . Connector
26 . . . Screw hole
24a . . . Terminal
27 . . . Lithium battery
28 . . . Outer wall
30 . . . Lead
32 . . . Connector
32a . . . Terminal
34 . . . Screw
36 . . . Screw head
38 . . . Spring
40 . . . Heat radiating structure
42 . . . Uneven wall structure
44 . . . Heat radiating member
44a, 44b, 44c . . . Portions of radiating member
46 . . . Projection
48 . . . Depression
50 . . . Heat radiating member
50a . . . Portion of heat radiating member
52 . . . Fan
54 . . . Air passage
56 . . . Push switch
58 . . . Actuator
60 . . . Spring
62 . . . Connector box
64 . . . Connector
66 . . . Mouse
68 . . . Protruding portion
70 . . . Inner space
72 . . . Door
74 . . . Pawl
76 . . . Engaging hole

What is claimed is:

1. An electronic apparatus comprising an apparatus body, and an electric part detachably attached to the apparatus body, the electric part is attached to an outer wall of the apparatus body, further said electric part has an electric part body having an outer wall which is arranged in contact with said outer wall of said apparatus body, and the electric part is provided with terminals for accomplishing electric connection of the electric part with the apparatus body and a heat radiating structure for radiating heat generated in the apparatus body, wherein the heat radiating structure comprises an uneven wall structure allowing a passage of air between an outer surface of the electric part and an outer surface of the apparatus body.

2. An electronic apparatus according to claim 1, wherein the heat radiating structure further comprises a heat radiating member for radiating heat generated in the apparatus body via the electric part.

3. An electronic apparatus according to claim 1, wherein the heat radiating structure further includes a fan for radiating heat generated in the apparatus body via the electric part.

4. An electronic apparatus according to claim 1, wherein the apparatus body and the electric part include a mechanical connection for mechanically connecting the electric part to the apparatus body.

5. An electronic apparatus according to claim 1, wherein the electric part comprises a battery pack.

6. An electronic apparatus according to claim 1, wherein the electric part is a connector box to which another part can be further attached.

7. An electronic apparatus according to claim 1, wherein the electric part extends along a rear portion of the apparatus body.

8. An electronic apparatus according to claim 1, wherein the electronic apparatus is a notebook type information processing apparatus, the electronic apparatus having the apparatus body with a portion including a keyboard and said electronic apparatus also having a portion, which includes a display, attached to the apparatus body.

9. An electronic apparatus according to claim 2, wherein the apparatus body includes a heat radiating member, and said heat radiating member of the electric part is connected to the heat radiating member of the apparatus body when the electric part is attached.

10. An electronic apparatus according to claim 7, wherein the length of the electric part is not less than half of the length of the rear portion of the apparatus body.

* * * * *

UNITED STATES PATENT AND TRADEMARK OFFICE
CERTIFICATE OF CORRECTION

PATENT NO. : 6,762,935 B2  
DATED : July 13, 2004  
INVENTOR(S) : Shigeru Hidesawa Page 1 of 1

It is certified that error appears in the above-identified patent and that said Letters Patent is hereby corrected as shown below:

Title page
Item [12], United States Patent, change "Hidewasa" to be -- Hidesawa --.
Item [75], Inventor, change "Shigeru Hidewasa, Kawaski (JP)" to be
-- Shigeru Hidesawa, Kawaski (JP) --.

Signed and Sealed this

Sixth Day of September, 2005

JON W. DUDAS
*Director of the United States Patent and Trademark Office*